UNITED STATES PATENT OFFICE.

HARRY A. BARMIER, OF CHICAGO, ILLINOIS.

PRINTING-INK AND PROCESS OF PRODUCING SAME.

1,383,512.  Specification of Letters Patent.  Patented July 5, 1921.

No Drawing.  Application filed November 22, 1919. Serial No. 340,059.

*To all whom it may concern:*

Be it known that I, HARRY A. BARMIER, a citizen of the United States, residing at Chicago, in the county of Cook and State of Illinois, have invented certain new and useful improvements in Printing-Ink and Processes of Producing Same, of which the following is a specification.

This invention has to do with the manufacture of a quick drying printing ink, superior in quality and having a wide range of use, from ingredients somewhat similar to those that have been used in the production of inks having a more or less limited field of usefulness.

It has been proposed to combine asphalt and mineral oils, also various products of petroleum distillation with certain binding media, as substitutes for printing ink varnishes made from linseed or other expensive vegetable oils.

Because of the nature of the substitutes selected, it has been stated to be desirable, if not necessary, to combine them by special treatments, the result being that whether due to the process of treatment, the character of the ingredients, or both, no ink of this general type has heretofore been produced which is satisfactory for use in high grade printing on every stock of paper.

I propose the manufacture of a printing ink varnish from gilsonite, fuel oil and paraffin oil. Gilsonite, or uintahite, is a brilliant black, very brittle variety of asphalt having a carbon content of from 10 to 20 per cent. It is mined in Uinta county, Utah. "Fuel oil" is a commercial term used to denote distillates heavier than illuminating oils and lighter than lubricating oils. "Paraffin oil" is a lubricant generally produced by the dry distillation method.

A detailed description of a preferred method of procedure based upon the employment of these ingredients is as follows: To 70 pounds of gilsonite which has been heated to a temperature of between 350° and 400° F., thereby becoming fused, 120 pounds of fuel oil are added, the mixture being thoroughly stirred and the high temperature maintained for a period of approximately 30 minutes. The mixture is then allowed to cool down to about 150° F., when 12 pounds of paraffin oil is incorporated therein. The resultant product is a viscid black varnish having a light brown undertone, which when ground in with a pigment provides an ink that will give a clear, sharp impression on any grade of stock, will dry on glazed surface paper within five minutes and on rough finished paper in a few seconds. On the other hand it will not dry on the printing press for several hours.

Variations in the proportions of ingredients, the temperatures and periods of treatment are permissible in practice without departure from the essence of the invention.

I claim:

1. A printing ink comprising gilsonite, fuel oil, paraffin oil and a pigment.

2. A printing ink comprising gilsonite, fuel oil and coloring matter combined in fluid consistency.

3. A printing ink varnish comprising gilsonite and fuel oil mixed at a temperature of 350° or over, and paraffin oil.

4. A printing ink varnish comprising gilsonite, fuel oil and paraffin oil mixed together under the influence of heat in the proportion of 70 pounds of gilsonite to 120 pounds of fuel oil to 12 pounds of paraffin oil.

5. The process of making a printing ink which consists in mixing gilsonite, fuel oil and paraffin oil in the presence of heat and adding a pigment.

6. The process of making a printing ink which comprises mixing gilsonite and fuel oil at a temperature sufficient to fuse the gilsonite, cooling the mixture, adding paraffin oil and then a pigment.

7. The process of making a printing ink varnish which comprises mixing gilsonite and fuel oil at a temperature sufficient to fuse the gilsonite, cooling and adding paraffin oil.

8. The process of making a printing ink which comprises heating a quantity of gilsonite to fuse the same mixing therewith approximately twice as much fuel oil, adding a quantity of paraffin oil equal to approximately one-tenth of the fuel oil content and incorporating a pigment.

9. The process of making a printing ink which consists in mixing gilsonite and fuel oil at a temperature sufficient to fuse the gilsonite, reducing the temperature of the mixture, incorporating therein a quantity of paraffin oil approximately equal to one tenth of the content of fuel oil and adding a pigment.

In witness whereof I have hereunto signed my name in the presence of two subscribing witnesses.

HARRY A. BARMIER.

Witnesses:
FRANKLIN M. WARDEN,
FRANCES K. GILLESPIE.

It is hereby certified that in Letters Patent No. 1,383,512, granted July 5, 1921, upon the application of Harry A. Barmier, of Chicago, Illinois, for an improvement in "Printing-Ink and Processes of Producing the Same," errors appear in the printed specification requiring correction as follows: Page 1, after line 90, insert the following as claim 7:

*7. The process of making a printing ink varnish which comprises mixing gilsonite and fuel oil at a temperature of 350° or over, allowing the mixture to cool, and adding paraffin oil.;* same page, line 91, for claim number "7." read *8.;* line 96, for claim number "8." read *9.;* and page 2, line 1, for claim number "9." read *10.;* and that the said Letters Patent should be read with these corrections therein that the same may conform to the record of the case in the Patent Office.

Signed and sealed this 23d day of August, A. D., 1921.

[SEAL.]

KARL FENNING,
*Acting Commissioner of Patents.*

Cl. 134—36.